(12) United States Patent
Greenberg (10) Patent No.: US 11,336,744 B2
(45) Date of Patent: May 17, 2022

(54) METHODS AND SYSTEMS FOR COMMUNICATING RELEVANT CONTENT

(71) Applicant: Comcast Cable Communications, LLC, Philadelphia, PA (US)

(72) Inventor: Benjamin E. Greenberg, Philadelphia, PA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 291 days.

(21) Appl. No.: 15/872,631

(22) Filed: Jan. 16, 2018

(65) Prior Publication Data

US 2019/0222672 A1 Jul. 18, 2019

(51) Int. Cl.

| | |
|---|---|
| *G06F 15/16* | (2006.01) |
| *H04L 67/60* | (2022.01) |
| *G06F 9/54* | (2006.01) |
| *H04L 67/02* | (2022.01) |
| *G06N 3/08* | (2006.01) |
| *H04L 41/14* | (2022.01) |
| *H04L 67/50* | (2022.01) |
| *H04L 67/306* | (2022.01) |

(52) U.S. Cl.
CPC .............. *H04L 67/32* (2013.01); *G06F 9/543* (2013.01); *G06F 9/547* (2013.01); *G06N 3/08* (2013.01); *H04L 41/145* (2013.01); *H04L 67/02* (2013.01); *H04L 67/22* (2013.01); *H04L 67/306* (2013.01)

(58) Field of Classification Search
CPC ....... H04L 67/32; H04L 67/22; H04L 67/306; H04L 67/02; H04L 41/145; G06F 9/543; G06F 9/547; G06N 3/08; G06N 20/00; G06N 7/005; H06N 20/00; H06N 7/005
See application file for complete search history.

(56) References Cited

U.S. PATENT DOCUMENTS

| | | | | |
|---|---|---|---|---|
| 2010/0029313 | A1* | 2/2010 | Dufourd | H04L 67/04 455/509 |
| 2011/0246561 | A1* | 10/2011 | Eshima | G06F 16/9535 709/203 |
| 2012/0137201 | A1* | 5/2012 | White | G06F 16/957 715/205 |
| 2014/0244727 | A1* | 8/2014 | Kang | H04L 65/4084 709/203 |
| 2016/0054871 | A1* | 2/2016 | Strike | G06F 16/2457 715/738 |
| 2017/0024392 | A1* | 1/2017 | Shah | G06F 16/24552 |
| 2018/0357682 | A1* | 12/2018 | Jackson, III | G06F 16/951 |

* cited by examiner

*Primary Examiner* — John B Walsh
(74) *Attorney, Agent, or Firm* — BakerHostetler (57) ABSTRACT

Methods and systems are described for efficient communication of content. A user device may request content from a content device. The content device may determine a browsing context of the user device. A user model based on machine learning may be determined based on the browsing context. The user model may be used to predicted additional content that might be requested by the user device. The additional content or a portion thereof may be sent to the user device in parallel with the originally requested content. As the user device rejects, accepts, or further requests the additional content, the user model may be further refined.

23 Claims, 7 Drawing Sheets

Example Request 302

GET uri://RecordingList

Example First Response 304

TTL: 5 minutes
Version: 100
RecordingList {
   URI: uri://RecordingList
   Recordings: [
     uri://Recording201,
     uri://Recording202,
     uri://Recording203
   ]
}

Example Second Response 306

TTL: 15 minutes
Version: 500
Recording {
   URI: uri://Recording201
   Image: uri://Recording1/image
   Title: ...
   Description: ...
   (etc.)
}

METHODS AND SYSTEMS FOR COMMUNICATING RELEVANT CONTENT

BACKGROUND

In processing requests for content, a content server may send additional content that is relevant to the requested content. However, current approaches for determining and communicating the additional content in a response are inefficient and limited. For example, the content server may not be able to efficiently determine how much relevant information to include. As an example, conventional approaches may comprise embedding the relevant content within the same response as the requested content, which has limited functionality and may be costly to process.

SUMMARY

Systems and methods are described for communicating resources between various devices, such as a content device and a user device. The content device may use machine learning, parallel communication, and other techniques to efficiently serve resources to a user device. The user device may, send to the content device, a request for content (e.g., a resource, such as an application resource). The request may be a hypertext transfer protocol request based on a hypermedia application program interface (API). The hypermedia API may use uniform resource identifiers (e.g., hyperlinks) to identifier resources. The content device may determine, based on the request, a browsing context of the request. The browsing context may comprise a browsing history, resource depth, client device type, device location, timing information, networking conditions, and/or any relevant information. The resource device may use a machine-learned model to predict additional resources relevant to the browsing context of the user device. The content device may send one or more responses to the request, such as multiple responses in parallel, or a single response comprising the requested resource with additional embedded resource.

The user device may accept or reject resources received in response to the request. The user device may compare the additional resource to local storage as well as determine whether the additional resource is relevant. The resource device may determine the response (e.g., accepted or rejected) of the user device to the additional resource. The resource device may update, based on the response of the user device and the context, the machine-learned model.

BRIEF DESCRIPTION OF THE DRAWINGS

The following description of the illustrative embodiments may be better understood when read in conjunction with the appended drawings. It is understood that potential embodiments of the disclosed systems and methods are not limited to those depicted.

DETAILED DESCRIPTION OF ILLUSTRATIVE EMBODIMENTS

Hypermedia APIs may be used to access content managed by a content device. The content may comprise data, resources, images, text, content pages (e.g. markup document), video, audio, and/or the like. The content may be requested and/or sent using a protocol, such as hypertext transfer protocol (HTTP) (e.g., HTTP 1.1, HTTP 2.0, and the like). The protocol may allow for embedding of additional content to minimize server roundtrips, which may be expensive, particularly on mobile devices. Embedding additional content may have several problems: 1) There is no standard or simple way to add cache semantics to individual content (e.g., HTTP cache semantics may only apply to the top-level resource, which may result in wasteful behavior if embedded content has longer time to live (TTL) values than the parent content), 2) embedding complex content in a single response may be expensive to generate and consume, and 3) embedding complex content may be wasteful if the content is only needed in certain scenarios. Additionally or alternatively, there is not an efficient way for the user device to indicate to the content device the user device's current cache status for all possible embedded content. A content device can be adapted to support different embedding behavior depending on the specific client request, but supporting different embedding behaviors can be complex to implement. The present methods and systems improve upon these approaches through the unconventional application of machine learning, parallel resource transmission, and/or other aspects described herein.

If a user device requests content, only the single resource requested may be returned by the content device receiving the request. Instead of embedding related content in a response with the requested content, the content device may include, in the response, a link to the related content (e.g., by a navigable identifier). The response from the content device may comprise cache semantics like a version identifier (e.g., ETag), a time-to-live that applies to the content returned, and/or the like. Additionally or alternatively, the content device may proactively send (e.g., push) the related content that the user device is predicted to need. The related content may be sent in parallel (e.g., multiplexed) to the original response as an additional content message. The additional content message may comprise a cache semantic relevant to the additional content. The content device may choose to send not just content that is linked to in the requested content, but also content linked to by other pushed content. In other words, a large content graph may be sent (e.g., via open connections) as a plurality of additional content messages (e.g., in parallel with the original response).

Content outside of the content graph may be returned as well, allowing for system wide information to be sent efficiently. The user device may notify the content device to cancel sending of the related content. The user device may notify the content device to cancel sending of the related content, if the user device determines that the user device does not need the related content for its use case, or if the user device does need the content but already has a fresh version cached. The user device may also use an open connection (e.g., an open transport layer connection and/or an open application layer connection) to the content device to request related content that is not sent by the content device and use the multiplex capabilities to receive the related content in parallel.

Figure 1:
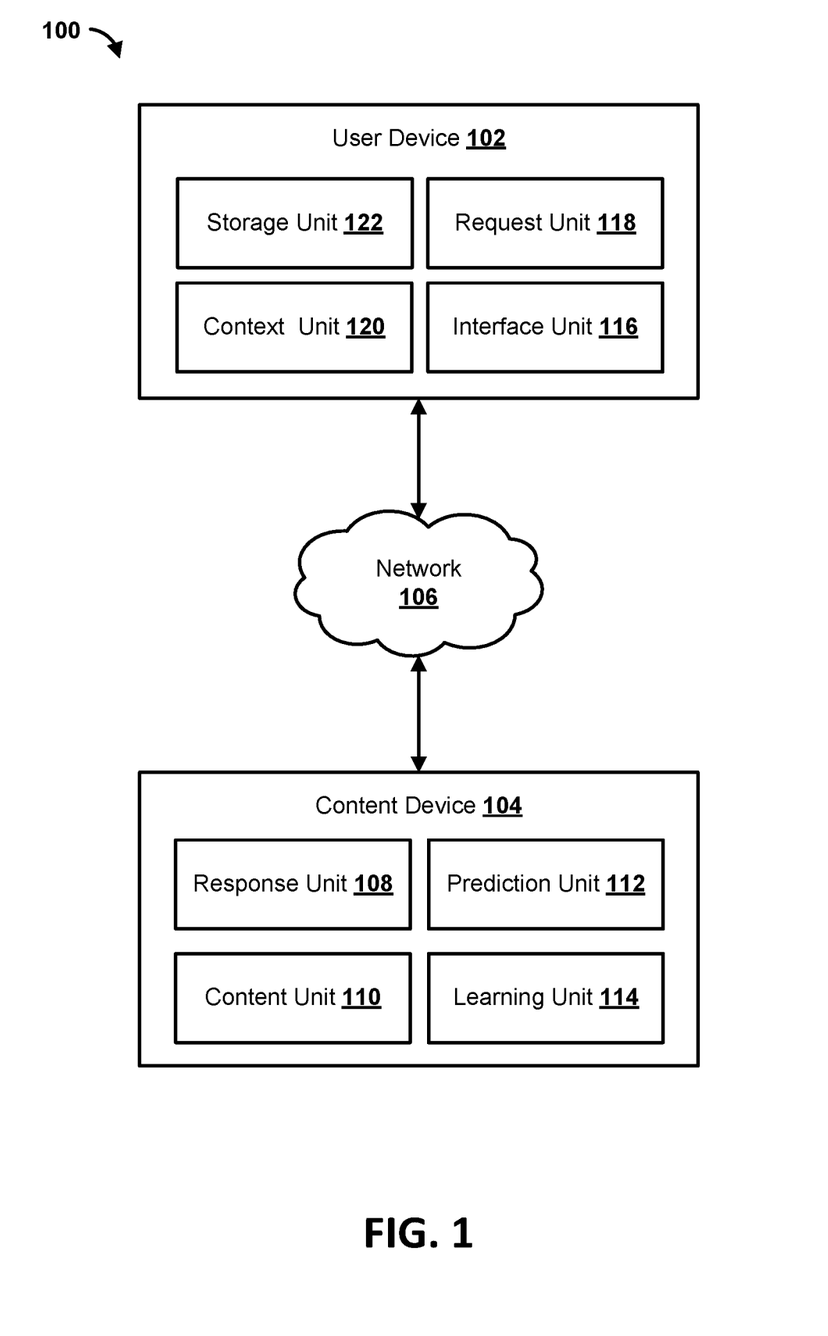
FIG. 1 shows an example system for communicating content.

FIG. 1 shows an example system 100 for communicating content. The system 100 may comprise a user device 102 and a content device 104. The content device 104 may be a server (e.g., HTTP server) remotely located from the user device 102. The user device 102 may comprise a mobile device, a smart device (e.g., a smart watch, smart apparel, smart glasses, smart phone, a smart appliance), a tablet, a computing station, home security system, onboard media system, and/or the like. The user device 102 and the content device 104 may be in communication via a network 106. The network 106 may comprise a packet-switched network, a non-packet switched network, and/or the like. The network 106 may comprise wireless links and/or wired links. The network 106 may comprise one or more routers, switches, gateways, access points, multiplexers and/or the like.

The content device 104 may comprise a response unit 108 configured to process requests from devices, such as the user device 102. The requests may be requests based on a protocol, such as hypertext transfer protocol. For example, the content device 104 may be configured to process request from a content browser on the user device 102. The requests may be requests for specific content (e.g., based on a uniform resource locator).

The response unit 108 may comprise a hypermedia application program interface. The hypermedia application program interface may comprise an interface configured to determine and/or generate content comprising a reference (e.g., an identifier, a link) to access additional content associated with generated content. The content device 104 may be configured to indicate information, such as functions, content, and/or the like, accessible via the hypermedia API. For example, the content device 104, may be configured to generate (e.g., via the hypermedia API) one or more messages comprising the information and/or one or more references, identifiers, and/or links that may be used to access the information.

The content device 104 may comprise a content unit 110. The content unit 110 may comprise content (e.g., resources), such as text, images, computer-executable code, video, audio, and/or the like. The content device 104 may store at least a portion of the content in a data store (e.g., database). In some scenarios, the content may be stored remotely. The content device 104 may be configured to query, access, retrieve, and/or store content in the data store (e.g., whether local or remote). As an illustration, the content may comprise hypermedia content comprises associations (e.g., links) to related content. As an example, hypermedia content may comprise a content page (e.g., web pages), a portion of content page, any content (e.g., video, audio, image, text, computer-executable code) linked to (e.g., or associated with) at least one other instance of content, and/or the like. The content may comprise content for an application, such as a mobile application, an application on a media device (e.g., set top box, content streaming device, television), and/or the like.

The content may comprise associations to related content. In some scenarios, the associations between content may be stored separately from the content. For example, first content may be associated with, related to, reference, link to, and/or the like first content. The second content may be associated with, related to, reference, link to, and/or the like second content. The first content may depend on the second content (e.g., for functionality). The first content may be configured to instruct the user device 102 to access the second content if a condition is satisfied. For example, the condition may comprise a type of device, application, location, timing information, user permissions, and/or the like. As an illustration, the first content may comprise a reference to one set of images, styles sheets, video for a mobile device (e.g., mobile phone) while referencing another set of images, style sheets, video, and/or the like for a set top box, laptop, or tablet.

The content device 104 may comprise a prediction unit 112 configured to predict additional content relevant to a device, such as the user device 102. The additional content may comprise content that the user device might request. The content device 104 may be configured to predict the additional content based on identification information. The identification information of the user device 102 may be determined from the request received from the user device 102. The first identification information may indicate a type of the second content, a name of the second content, a use of second content and/or the like. The first identification information may be compared, matched, and/or otherwise analyzed in relation to the browsing context.

The content device 104 may be configured to predict the additional content based on a context (e.g., a browsing context, a device context, a request context, a network context, a user context, a content context, a user interface context). The context may comprise a context of the user device. The context of the user device may relate to the user, the properties of the user device, and/or other conditions (e.g., network conditions, the content device 104 receiving the request) associated with the first request. The content device 104 may determine the context in response to receiving the first request. The context may be sent, by the user device 102, in the first request. The context may be determined (e.g., generated) based on information in the first request. The context may comprise a requested resource depth indicating a number of levels of content associations of interest. As an illustration, a resource depth of two levels indicates an interest in links of the first content as well as links of content linked to the first content. The context may comprise device information (e.g., a type of the user device, power information, processor information), browser information (e.g., application, version), historical information (e.g., the last content requested, the content that referenced and/or indicated the presence of the first content, last time the first content was requested), user information, location information (e.g., type of place, coordinates, home, work, travel), a combination thereof, and/or the like.

The prediction unit 112 may be configured to determine a user model (e.g., user data set, a statistical model, a relationship model, a user profile, a device model, a device profile, or a combination thereof) for content access prediction. The user model may comprise a user profile, a set of probabilities associated with a user or a device, a statistical model. For example, the user model may comprise a set of relationships between data types, relationships between contextual information (e.g., type of device, type of content, session history) and types of data (e.g., secondary content, visual content, hidden content, video content, audio content, type of information), a combination thereof, and/or the like.

The user model may be determined based on the identification information. The user model may be determined based on the browsing context. Determining the user model may comprise determining the user model from a plurality of baseline user models. The plurality of baseline user models may be stored by the content device 104 and/or stored remotely. The plurality of baseline user models may be machine-learned models based on prior behavior of one or more devices requesting content. The user model may comprise a user model of the plurality of baseline user models that matches (e.g., within a threshold, closest to) the user context. The user model may be a user model previously associated with the user device 102.

The user model may comprise one or more rules, associations, and/or the like. The associations may comprise associations of context information with corresponding rules for predicting additional content. The additional content may be content that the user device has not yet requested. The additional content may be content the user device might (e.g., is predicted to) request and/or consume. The user model may comprise a decision tree, a statistical model (e.g., neural network), a logical rule, a vector machine, clusters (e.g., data classified as sets and/or subsets), Bayesian network, and/or the like. The user model may comprise information associated with a specific user. The information associated with the specific user may comprise device information (e.g., the type of device the user is operating), network information (e.g., the type of network to which the user device is connected), and usage information (e.g., historical usage patterns of the specific user), related usage information (e.g., historical usage patterns of user determined to be similar (e.g., based on machine learning, a rule engine). A different user model may be generated for each of a plurality of users, groups of users of the plurality of users, and/or the like.

The content device 104 may determine second content associated with the first content. The first content may reference (e.g., link to) the second content. The second content may be determined based on the user model and/or the user context. The second content may be determined based on content historically requested by the specific user or similar users, environmental factors (e.g., network condition, time of day), content-based rules based on resource affinity, an association of the second content and the first content (e.g., some second content may always be returned with first content regardless of user model and/or user context), a combination thereof, and/or the like.

The content device 104 may send the first content and/or the second content to the user device 102. The first content and/or the second content may be sent in response to the first request from the user device 102. Sending the first content and/or the second content may comprise sending the first content in a first response and sending the second content in a second response. The first response may be sent at least partially in parallel to the second response. The first content and/or second content may be sent based on hypertext transfer protocol (e.g., HTTP 2.0). The first response and the second response may be sent via the same connection (e.g., HTTP connection). In some scenarios, the first content may be sent with (e.g., together, or separately) a reference to the second content. The reference to the second content may be sent instead of sending all or a portion of second content. The reference may comprise an identifier (e.g., a uniform resource identifier, a link) of the second content. The identifier may reference a network location for accessing the second content.

The content device 104 may comprise a learning unit 114 configured to update (e.g., optimize, refine, generate, change modify) the user model and/or the plurality of baseline user models. The content device 104 may be configured to update the user model based on a response of the user device 102 (e.g., to the second content sent and/or indicated to user device 102). The response may be determined by the content device 104 based on receiving a message and/or failing to receive a message from the user device. For example, determining the response of the user device 102 may comprise receiving a response (e.g., accepting, rejecting, or requesting the second content). If no response is received within a predetermined time after sending the first content and/or the second content, the response may also be determined. For example, if the second content is sent completely without being rejected by user device 102, it can be determined that the second content is accepted by the user device 102. If only a portion or a reference to the second content is sent and the second content is not requested, then it can be determined that the second content is rejected by the user device 102. The content device may update the user model in response to determining the response of the user device 102.

The user model may be updated based on the browsing context. One or more associations, rules, statistics, and/or the like may be added, modified, and/or deleted from the user model. Updating the user model may comprise generating a new user model while leaving the original user model un-modified. For example, one or more of the decision tree, the statistical models (e.g., neural network), the logical rules, the vector machine, the clusters (e.g., data classified as sets and/or subsets), the Bayesian network, and/or the like may be added, modified, and/or deleted.

Returning now to the user device 102, the user device 102 may comprise an interface unit 116 configured to render content to a user of the user device. The interface unit 116 may comprise an application, such as a web browser, a mobile application, an application on a media device (e.g., set top box, television, streaming device). The application may be configured to process computer-readable code within the content. The interface unit 116 may render the content via one or more user interfaces.

The user device 102 may comprise a request unit 118 configured to request content from a device, such as the content device 104. The user device 102 may be configured to use various protocols, such as internet protocol, transport control protocol, hypertext transfer protocol, and/or the like. A request, such as a first request for first content, may be initiated by the application. The user device 102 may send the first request. The first content may comprise data from a database, a video, audio, text, image, a communication session, and/or the like.

In some implementations, the request unit 118 may be configured to send a context (e.g., a browsing context, a device context, a request context, a network context, a user context, a content context, a user interface context) associated with the first request. The context may be managed by a context unit 120. The context unit 120 may track, modify, update, and/or the like the context. The context may be explicitly set and/or tracked by user device. For example, the user device may query state information of the user device and other data to determine the context. The context may also be determined implicitly (e.g., inferred) by the content device 104. The context may be determined implicitly based on the characteristics of the request, such as network information and performance, time of day, a combination thereof, and/or the like.

The context may comprise a requested resource depth indicating a number of levels of content associations of interest. The resource depth may vary depending on conditions, such as power conditions, network conditions, time of day, and location. As an illustration, a resource depth of two levels indicates an interest in links of the first content as well as links of content linked to the first content. The context may comprise device information (e.g., a type of the user device, power information, processor information, amount of memory, speed, manufacturer, device model, supported capabilities/features), browser information (e.g., application, version), historical information (e.g., the last content requested, the content that referenced and/or indicated the presence of the first content, last time the first content was requested), user information (e.g., user identification), location information (e.g., type of place, coordinates, home, work, travel), network information (e.g., a type of network, such as cellular, 3G, 4G, LTE, Wi-Fi), network properties (e.g., network name, owner of network), a combination thereof, and/or the like.

The user device 102 may be configured to wait for a response to the first request. The user device 102 may be configured to receive multiple responses (e.g., in parallel). For example, the first content may be received a first response. Additionally or alternatively, the second content and/or a reference to the second content may be received in a second response. The first response may be received in parallel to the second response. The first content and/or the second content may be received based on hypertext transfer protocol (e.g., HTTP 1.1, HTTP 2.0). The first response and the second response may be received via the same connection (e.g., TCP connection, HTTP connection).

The user device 102 may be configured to determine whether the second content is useful, relevant, needed, and/or the like. The user device 102 may be configured to determine whether the second content is relevant to the context of the user device.

The context of the user device may indicate whether the user device already has a stored copy of the second content. The user device 102 may be configured to determine whether the second content is already located in a local storage. The local storage may be comprised in a storage unit 122. The local storage may comprise a local cache, an application cache, an application storage, a browser cache, and/or the like of the user device 102. Identification information may be determined from the second response. The identification information may be compared to identification information of files in local storage. If the identification information matches identification information of one of the files in the local storage, then the user device 102 may determine to reject and/or not to request the second content.

The context of the user device may indicate whether the user device 102 has an expired version of the second content. The user device 102 may determine whether a time to live (TTL) value associated with the second content is expired. For example, a local file matching the second content may comprise a TTL value indicating an expiration date of the second content. If the TTL value is expired, the user device 102, may determine to request the second content again. In some implementations, a token may be used to determine whether the second content is expired. The token may be received with the first identification information of the second content. If the token is different than a stored token associated with the local file matching second content, then the second content may be expired.

The user device 102 may be configured to send a message in response to the first content and/or the second content from the content device 104. The message may accept (e.g., request) or reject the second content. The message may be sent based on (e.g., in response to) determining whether the second content is relevant to the context. The message may be sent based on (e.g., in response to) determining whether the second content is located in the local cache.

Figure 2:
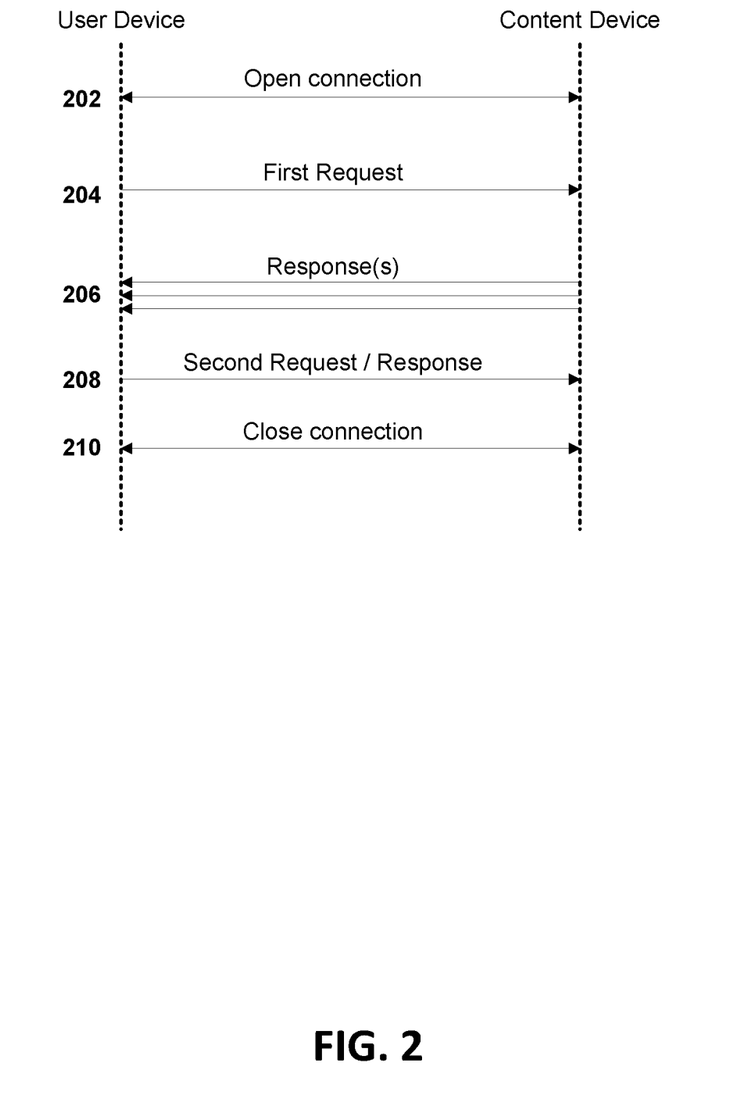
FIG. 2 shows an example sequence diagram for communicating content.

FIG. 2 shows an example sequence diagram for communicating content. At step 202, a connection between a user device and a content device may be established (e.g., opened). The connection may comprise a transport layer connection, such as a connection based on transport control protocol. At step 204, the user device may send a request for first content. The content device may receive the request. The content device may predict that the user device might request additional content. For example, a user model and/or context may be used by the content device to determine that the user device is likely to request second content and third content. The context may comprise attributes of the user device. For example, the user device may identify itself and provide context for the request. The user device may specifically request a given depth of content. The content device may use machine learning to determine the additional content. Based on user device information and the context sent by the client, the content device may use predictive models for determining which content is likely to be retrieved by a user device in a given scenario. As more requests are received, the model can be adapted to more accurately predict which additional content to send to the user device to increase efficiency. The machine-learning may be applied globally to all of the user devices or to a portion of the user devices accessing the API. Global models, such as baseline models for variety of scenarios, may be applied to future devices that have never communicated with the API.

At step 206, the content device may send several responses to the user device in response to the request for the first content. A first response may comprise the first content. A second response may comprise the second content and/or a reference (e.g., link to) the second content. The third response may comprise the third content and/or a reference (e.g., link to) the third content. The first response, the second response, and the third response may be sent at least partially in parallel (e.g., multiplexed). For example, the first response, the second response, and the third response may be sent before another requests/response is received. The first response, the second response, and the third response may be sent at least partially at the same time.

At step 208, the user device may send a second response to the content device. The second response may comprise a request for the second content and/or third content (e.g., if only a portion of or only a reference to the content was sent in step 206). The second response may comprise a rejection of the second content and/or third content). For example, the rejection may be sent before all of the second content and/or the third content is received by the user device.

The user device may locally store content (e.g., resource) received along with corresponding time to live (TTL) and version information, which may be keyed (e.g., for purpose of searchability) by a corresponding uniform resource identifier (URI). Initially, the user device may access (e.g., read) only a URI and/or version information of the additional content. The URI and/or version information may be compared to corresponding information in the user device's local store. If the TTL is not expired and/or the version matches, the user device may reject the addition content. Otherwise, the user device may retrieve the full copy of the additional content.

Additionally or alternatively, the user device may not have a cached copy of the additional content, but may determine that that additional content is not relevant. This may occur if the content device sent (e.g., pushed) additional content that the user device did not need for any functionality (e.g., it may be required in other contexts, or the content device may just be over-aggressive). However, based on the URI and version information alone, the user device may not have enough information to determine whether the additional content is relevant (e.g., or needed) or not. The content device may send additional context information about the additional content. The additional context information may be sent in a header portion, such as tags that comprise hints about what is comprised in the content and/or potential uses of the additional content. For example, the content device may send type information (e.g., program, recording, person, etc.) about the additional content. As example, the content device may send sample attribute names associated with the second content. Based on the additional context information, the user device may determine if, in the context of the user device, the additional content is useful or not.

At step 210, the user device and/or content device may end (e.g., close) the connection between the user device and the content device. The user device or the content device may send an instruction to close the connection. The sequence can be repeated for sending a variety of content between content device and the user device.

As an illustration, the user device may comprise a mobile app or a media device (e.g., set top box, streaming media device). At step 204, the user device may request a list of recordings. For example, the first request may comprise a request for a list of links to the recordings. At step 206, the content device may respond to the first request by sending one or more (or each) the recording resources in the list of the recordings. A recording resource may comprise data and/or metadata, such an image file representing cover-art associated with the recording. The user device may reject one or more of the recording resources, such as a recording resource comprising an image file representing the cover-art. The content device may determine that some user devices are likely to display cover art but others are not. In the former case, the content device may send the image even though not explicitly requested. In the latter, the content device may determine not to send the image unless explicitly requested.

Figure 3:
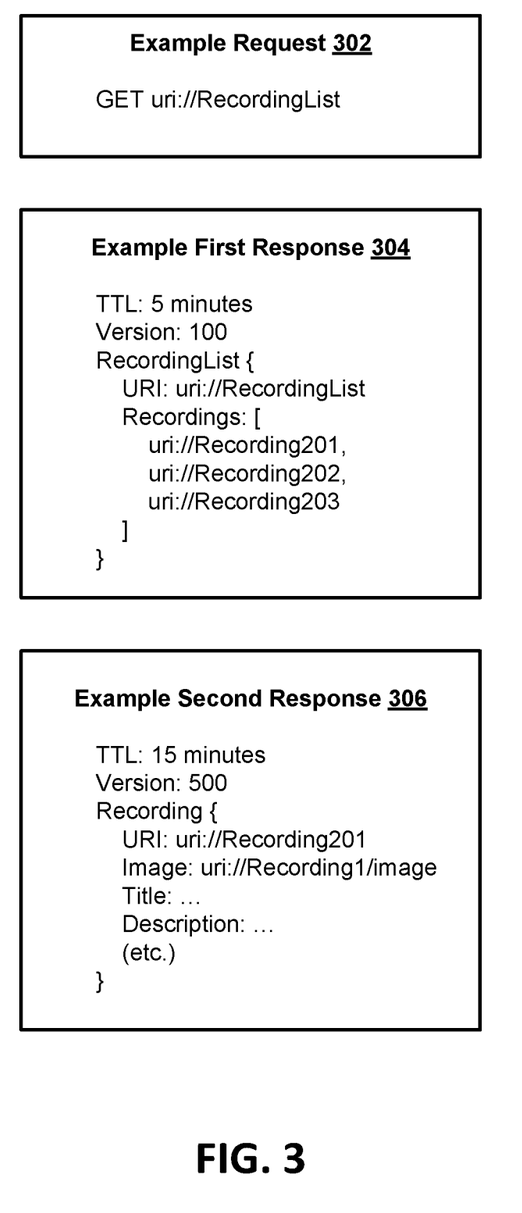
FIG. 3 shows example messages for communicating content.

FIG. 3 shows example messages for communicating content. A request 302 may be sent by a user device to a content device. The request may comprise a request for a list of recordings (e.g., content recordings). The request may comprise a command, such as a "GET" command. The request may comprise a uniform resource identifier (URI) associated with a specific resource, such as "RecordingList" which is associated with a list of recordings and/or a command to obtain a list of recordings.

A content device may receive the request 302. The content device may send a first response 304 in response to the request 302. The first response 304 may comprise the content requested in the request 302. The content may be a data resource formatted according to javascript object notation (JSON), extensible markup language (XML), and/or other language. The content may comprise data stored in one or more fields. The content may comprise a list of references (e.g., links) to recordings. The first response 304 may comprise timing information, such as a time-to-live (TTL) value indicating a time period that the content is valid. The first response 304 may comprise version information indicating a version of the content. The timing information and/or the version information may be used by the user device to evaluate whether to accept, reject, retrieve, or request additional content associated with the content.

The content device may send a second response 306 in response to the request 302. The second response 306 may be sent to the user device at least partially in parallel with the first response 304. The second response 306 may be generated based on a user model, a user context, and/or the like as described herein. The user model may predict that the user device is likely to request additional content, such as an image (e.g., cover-art) associated with a content recording. The second response 306 may comprise the additional content. The additional content may comprise information associated with one of the recordings listed in the first response 304. The additional content may comprise references (e.g., links) to associated content, such as images (e.g., cover-art), metadata (e.g., title, description, genre), and/or the like. The second response 306 may comprise timing information, such as a time-to-live (TTL) value indicating a time period that the additional content is valid. The second response 306 may comprise version information indicating a version of the additional content. The timing information and/or the version information may be used by the user device to evaluate whether to accept, reject, retrieve, or request the additional content. For example, the user device may reject the second response 306 because the user device determines that the user device already has the additional content, the additional content is not supported by the user device, the user device is too low on memory (e.g., or other resource, such as bandwidth, battery power), and/or any other appropriate reason. The user device may accept the second message, for example, if the user device determines that the version is higher than a version of additional content previously stored, if a TTL of a prior message is expired, and/or any other appropriate reason.

The content device may also send additional messages in response to the request 302. For example, an additional response message may be sent for each of the recordings listed in the list of recordings.

Figure 4:
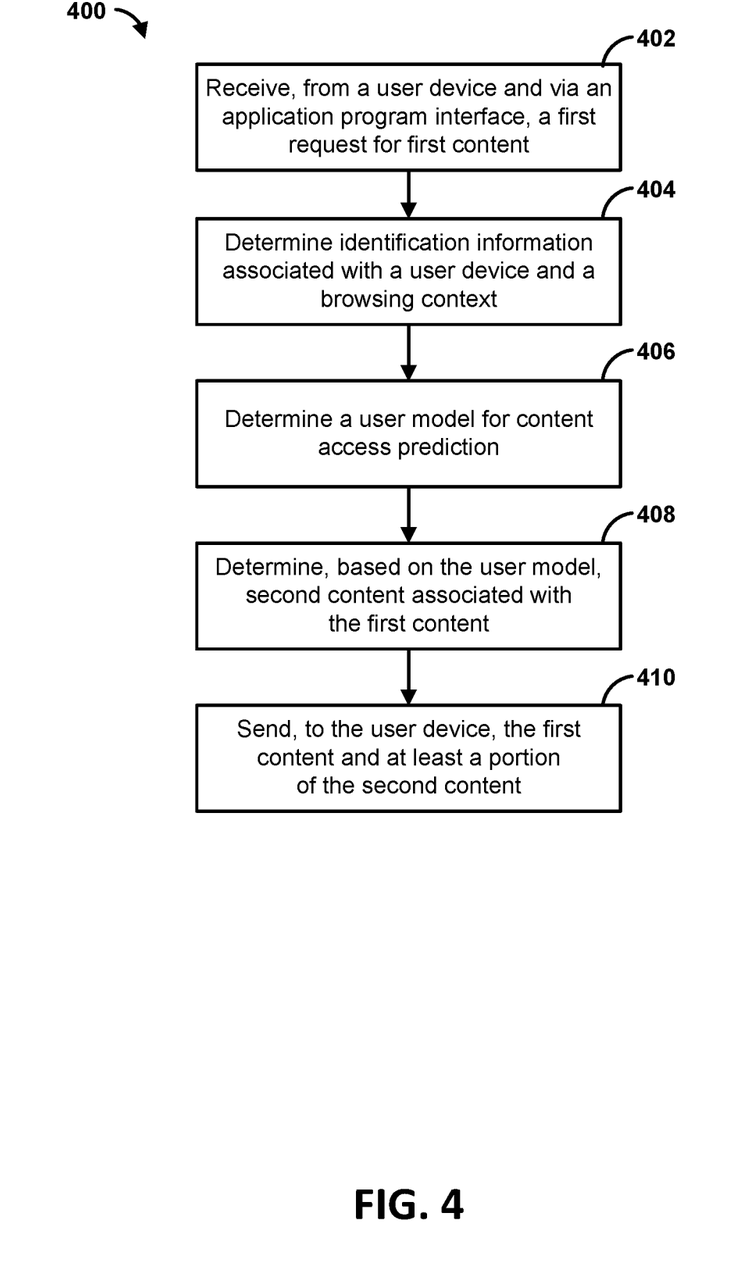
FIG. 4 shows a flow diagram of an example method for communicating content.

FIG. 4 shows a flow diagram of an example method 400 for communicating content. At step 402, a first request for first content may be received. The first request may be received from a user device. The first request may be received by a content device (e.g., a content server, a resource device). For example, receiving the first request for the first content may comprise receiving a hypertext transfer protocol request via a content browser. For example, the content browser may cause the user device to send the first request. The content device may be a server (e.g., HTTP server). The content device may be remotely located from the user device. The user device may comprise a mobile device, a smart device (e.g., a smart watch, smart apparel, smart glasses, a smart phone, a smart appliance), a tablet, a computing station, a home security system, an onboard media system, and/or the like.

The first request may be based on (e.g., or via) an application program interface (API). The application program interface may comprise a hypermedia application program interface. The application program interface (e.g., or the hypermedia application program interface) may comprise an interface configured to determine and/or generate content comprising a reference (e.g., an identifier, a link) to access additional content associated with generated content. The content device may be configured to indicate information, such as functions, content, and/or the like, accessible via the API (e.g., or the hypermedia API). For example, the content device, may be configured to generate (e.g., via the API or the hypermedia API) one or more messages comprising the information and/or one or more references, identifiers, and/or links that may be used to access the information.

At step 404, identification information associated with the user device may be determined. A browsing context associated with the user device may be determined. The browsing context may be sent, by the user device, in the first request. The browsing context may be determined (e.g., generated) based on information in the first request. The browsing context may comprise a requested resource depth indicating a number of levels of content associations of interest. As an illustration, a resource depth of two levels indicates an interest in links of the first content as well as links of content linked to the first content. The browsing context may comprise device information (e.g., a type of the user device, power information, processor information), browser information (e.g., application, version), historical information (e.g., the last content requested, the content that referenced and/or indicated the presence of the first content, last time the first content was requested), user information, location information (e.g., type of place, coordinates, home, work, travel), a combination thereof and/or the like.

At step 406, a user model (e.g., user profile, user data, user data set, device profile, device data, session profile, session data) for content access prediction may be determined. The user model may be determined based on the identification information. The user model may be determined based on the browsing context. The user model may be based on usage of the application programming interface by one or more user devices. The user model may be trained (e.g., learned via machine learning) based on usage of the application programming interface by one or more user devices. Determining the user model may comprise determining the user model from a plurality of baseline user models. The plurality of baseline user models may be machine-learned models based on prior behavior of one or more devices requesting one or more contents. The user model may comprise a user model of the plurality of baseline user models that matches (e.g., within a threshold, closest to) the user context. The user model may be a user model previously associated with the user device. The user model may comprise data indicating a probability of the user device accessing the second content.

The user model may comprise one or more rules, associations, and/or the like. The associations can comprise associations of context information with corresponding rules for predicting additional content. The additional content may be content that the user device has not yet requested. The additional content may be content the user device might (e.g., is predicted to) request and/or consume. The user model may comprise a decision tree, a statistical model (e.g., neural network), a logical rule, a vector machine, clusters (e.g., data classified as sets and/or subsets), Bayesian network, and/or the like. The user model may comprise information associated with a specific user. The information associated with the specific user may comprise device information (e.g., the type of device the user is operating), network information (e.g., the type of network to which the user device is connected), and usage information (e.g., historical usage patterns of the specific user), related usage information (e.g., historical usage patterns of user determined to be similar (e.g., based on machine learning, a rule engine). A different user model may be generated for each of a plurality of users, groups of users of the plurality of users, and/or the like.

At step 408, second content associated with the first content may be determined (e.g., by the content device). The first content may reference (e.g., link to) the second content. The first content may reference the second content. The first content may comprise an identifier for accessing the second content. The first content may comprise a field comprising the identifier for accessing the second content, a link to the second content, or a list of data resources associated with the first content. The second content may be determined based on the user model and/or the user context. The second content may be determined based on content historically requested by the specific user or similar users, environmental factors (e.g., network condition, time of day), content-based rules based on resource affinity, an association of the second content and the first content (e.g., some second content may always be returned with first content regardless of user model and/or user context), a combination thereof, and/or the like.

At step 410, the first content and/or the second content may be sent (e.g., by the content device). The first content and/or the second content may be sent to the user device. The first content and/or at least a portion of the second content may be sent based on (e.g., in response to) the first request. Sending the first content and/or the second content may comprise sending the first content in a first response and sending the second content in a second response. The first response may be sent at least partially in parallel to the second response. The first content and/or second content may be sent based on hypertext transfer protocol (e.g., HTTP 2.0). The first response and the second response may be sent via the same connection (e.g., HTTP connection).

A response by the user device to the at least a portion of the second content may be determined. Determining the response of the user device can comprise receiving a response (e.g., accepting, rejecting, or requesting the second content). If no response is received within a predetermined time after sending the first content and/or the at least a portion second content, the response can also be determined. For example, if the second content is sent completely without being rejected by user device, it can be determined that the second content is accepted by the user device. If only a portion or a reference to the second content is sent and the second content is not further requested, then it can be determined that the second content is rejected by the user device.

The user model may be updated. The user model may be updated based on the response. The user model may be updated based on the browsing context. One or more associations, rules, and/or the like may be added, modified, and/or deleted from the user model. Updating the user model may comprise generating a new user model while leaving the original user model un-modified. For example, one or more of the decision tree, the statistical models (e.g., neural network), the logical rules, the vector machine, the clusters (e.g., data classified as sets and/or subsets), the Bayesian network, and/or the like may be added, modified, and/or deleted.

Figure 5:
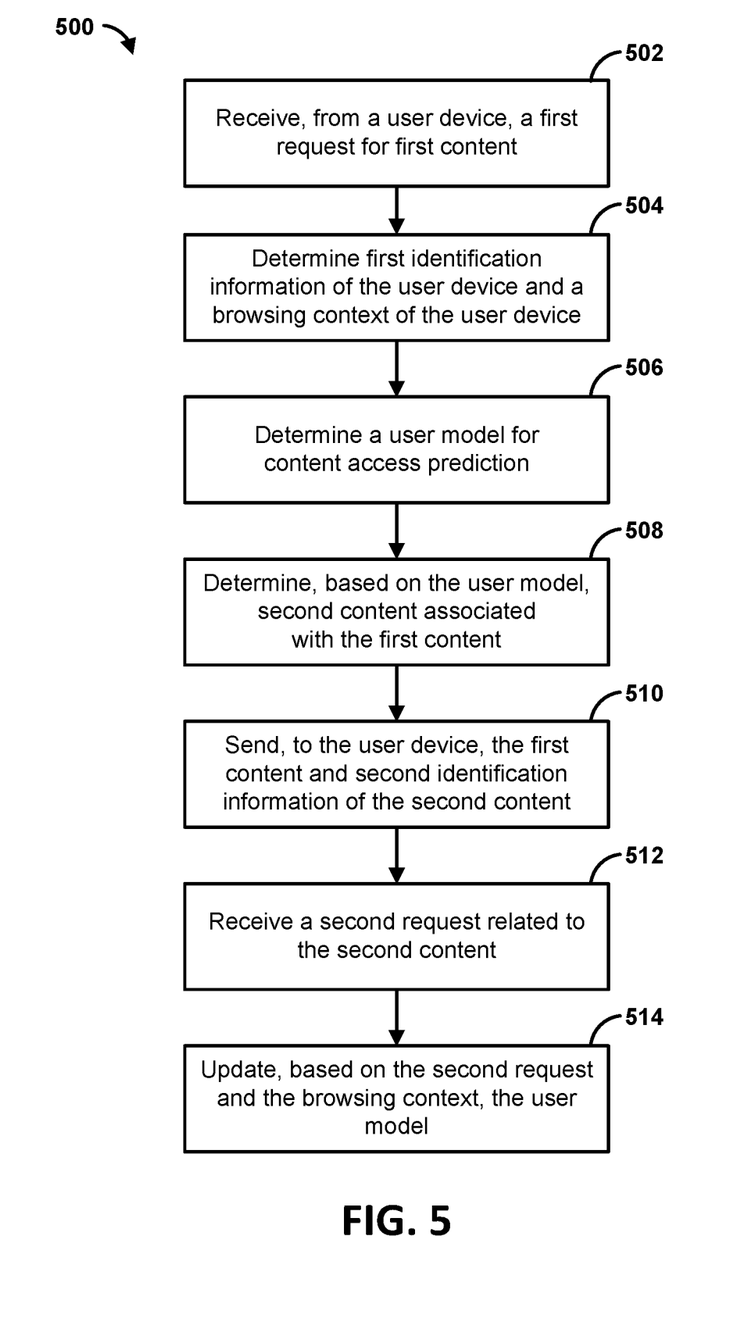
FIG. 5 shows a flow diagram of an example method for communicating content.

FIG. 5 shows a flow diagram of an example method 500 for communicating content. At step 502, a first request for first content may be received. The first request may be received from a user device. The first request may be received by a content device (e.g., content server, resource device). For example, receiving the first request for the first content may comprise receiving a hypertext transfer protocol request from a content browser. The content device may be a server (e.g., HTTP server). The content device may be remotely located from the user device. The user device may comprise a mobile device, a smart device (e.g., a smart watch, smart apparel, smart glasses, a smart phone, a smart appliance), a tablet, a computing station, a home security system, an onboard media system, and/or the like.

The first request may be based on an application program interface (API). The application program interface may comprise a hypermedia application program interface. The application program interface (e.g., or hypermedia application program interface) may comprise an interface configured to determine and/or generate content comprising a reference (e.g., an identifier, a link) to access additional content associated with requested content. The content device may be configured to indicate information, such as functions, content, and/or the like, accessible via the API (e.g., or the hypermedia API). For example, the content device, may be configured to generate (e.g., via the API or hypermedia API) one or more messages comprising the information and/or one or more references, identifiers, and/or links that may be used to access the information.

At step 504, first identification information of the user device may be determined. A browsing context of the user device may be determined. The browsing context may be sent, by the user device, in the first request. The browsing context may be determined (e.g., generated) based on information in the first request. The browsing context may comprise a requested resource depth indicating a number of levels of content associations of interest. As an illustration, a resource depth of two levels indicates an interest in links of the first content as well as links of content linked to the first content. The browsing context may comprise device information (e.g., a type of the user device, power information, processor information), browser information (e.g., application, version), historical information (e.g., the last content requested, the content that referenced and/or indicated the presence of the first content, last time the first content was requested), user information, location information (e.g., type of place, coordinates, home, work, travel), a combination thereof and/or the like.

At step 506, a user model for predicting content consumption may be determined. The user model may be determined based on the first identification information. The user model may be determined based on and the browsing context. The user model may be trained based on usage of the application programming interface by one or more user devices. Determining the user model may comprise determining the user model from a plurality of baseline user models. The plurality of baseline user models may be machine-learned models based on prior behavior of one or more devices requesting content. The user model may comprise a user model of the plurality of baseline user models that matches (e.g., within a threshold, closest to) the user context. The user model may be a user model previously associated with the user device. The user model may comprise information associated with a specific user. The information associated with the specific user may comprise device information (e.g., the type of device the user is operating), network information (e.g., the type of network to which the user device is connected), and usage information (e.g., historical usage patterns of the specific user), related usage information (e.g., historical usage patterns of user determined to be similar (e.g., based on machine learning, a rule engine). A different user model may be generated for each of a plurality of users, groups of users of the plurality of users, and/or the like.

The user model may comprise one or more rules, associations, and/or the like. The associations can comprise associations of context information with corresponding rules for predicting additional content. The additional content may be content that the user device has not yet requested. The additional content may be content the user device might (e.g., is predicted to) request and/or consume. The user model may comprise a decision tree, a statistical model (e.g., neural network), a logical rule, a vector machine, clusters (e.g., data classified as sets and/or subsets), Bayesian network, and/or the like.

At step 508, second content associated with the first content may be determined. The first content may reference (e.g., link to) the second content. The first content may reference the second content based on one or more of a field comprising an identifier of the second content, a link to the second content, or a list of data resources associated with the first content. The second content may be determined based on the user model and/or the user context. The second content may be determined based on content historically requested by the specific user or similar users, environmental factors (e.g., network condition, time of day), Content-based rules based on resource affinity, an association of the second content and the first content (e.g., some second content may always be returned with first content regardless of user model and/or user context), a combination thereof, and/or the like.

At step 510, the first content and/or the second identification information of the second content may be sent. The first content and/or the second identification information of the second content may be sent to the user device. The first content and/or the second identification information of the second content may be sent in response to the first request. Sending the first content and/or the second identification information of the second content may comprise sending the first content in a first response and sending the second identification information in a second response. The first response may be sent in parallel to the second response. The first content and/or second content may be sent based on hypertext transfer protocol (e.g., HTTP 2.0). The first response and the second response may be sent via the same connection (e.g., HTTP connection).

At step 512, a second request associated with the second content may be received. The second request may comprise a request for the second content. The second request may comprise a request for additional information about the second content. The second request may comprise a request for third content. The third content may be referenced by (e.g., or otherwise associated with) the first content and/or the second content.

At step 514, the user model may be updated. The user model may be updated based on the second request. The user model may be updated based on the browsing context. One or more associations, rules, and/or the like may be added, modified, and/or deleted from the user model. Updating the user model may comprise generating a new user model while leaving the original user model un-modified. For example, one or more of the decision tree, the statistical models (e.g., neural network), the logical rules, the vector machine, the clusters (e.g., data classified as sets and/or subsets), the Bayesian network, and/or the like may be added, modified, and/or deleted.

Figure 6:
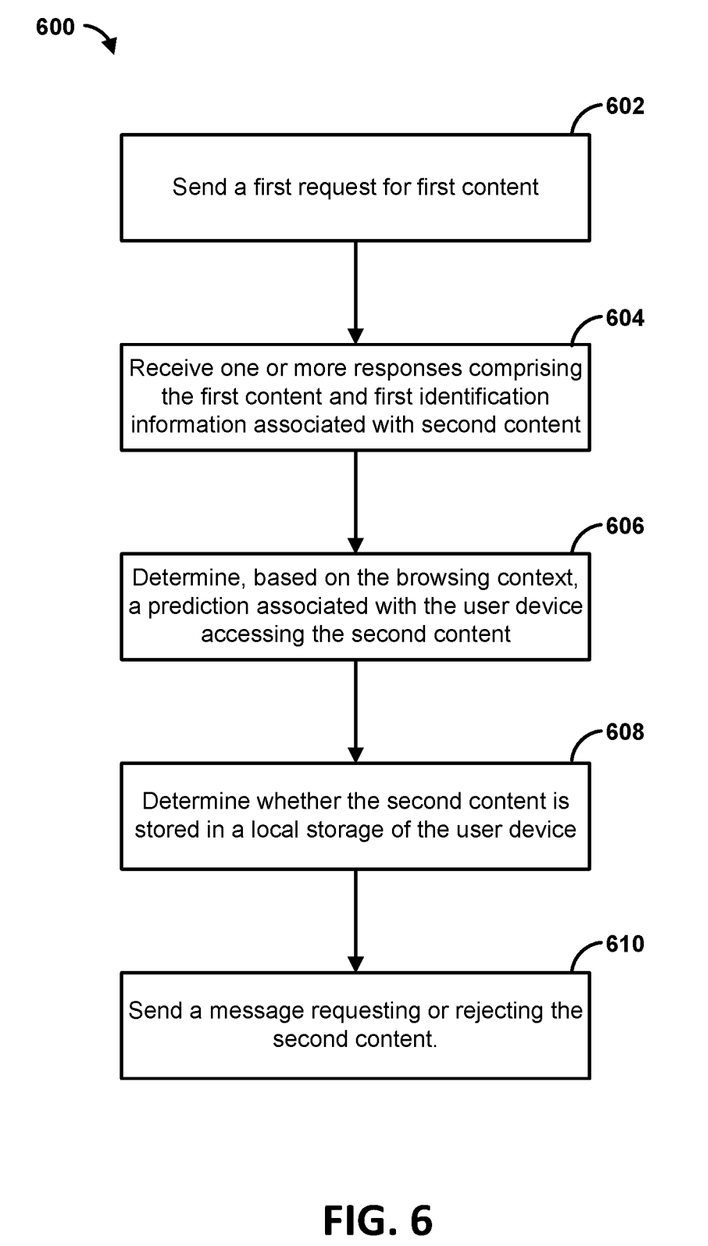
FIG. 6 shows a flow diagram of an example method for communicating content.

FIG. 6 shows a flow diagram of an example method 600 for communicating content. At step 602, a first request for first content may be sent. The first request may be sent by a user device. The first request may be sent to a content device (e.g., content server, resource device). The content device may be a server (e.g., HTTP server) remotely located from the user device. The user device may comprise a mobile device, a smart device (e.g., a smart watch, smart apparel, smart glasses, a smart phone, a smart appliance), a tablet, a computing station, a home security system, an onboard media system, and/or the like. Sending the first request for the first content may comprise sending a hypertext transfer protocol request via (e.g., or from) a content browser.

The first request may be based on an application program interface (API). The first request may be sent to the application API. The API may be associated with the content device. The application programming interface may comprise a hypermedia application program interface. The application program interface (e.g., or hypermedia application program interface) may comprise an interface configured to determine and/or generate content comprising a reference (e.g., an identifier, a link) to access additional content associated with generated content. The content device may be configured to indicate information, such as functions, content, and/or the like, accessible via the API. For example, the content device, may be configured to generate (e.g., via the API or hypermedia API) one or more messages comprising the information and/or one or more references, identifiers, and/or links that may be used to access the information.

At step 604, one or more responses may be received. The one or more responses may be from the content device. The one or more responses may be received based on (e.g., in response to) sending the first request. The one or more responses may comprise the first content. The one or more responses may comprise first identification information of second content. For example, the first content may be received in the same response as the first identification information. The first content may be received in a first response and at least a portion of the second content may be received in a second response. The first response may be received via a first logical connection, such as a first stream (e.g., HTTP stream). The second response may be received a second logical connection, such as a second stream (e.g., HTTP stream) different than the first stream. For example, the content device may open the second logical connection (e.g., second stream) before (e.g., or without) receiving a request for the second content. The first content may reference the second content. The first content may comprise an identifier for accessing the second content. The first content may comprise one or more of a field comprising the identifier for accessing the second content, a link to the second content, or a list of data resources associated with the first content.

The first response may be received in parallel to the second response. The first content and/or the at least the portion of the second content may be sent based on hypertext transfer protocol (e.g., HTTP 1.1, HTTP 2.0). The first response and the second response can be received via the same connection (e.g., HTTP connection), via different connections, via the same connection but via different streams, and/or the like.

At step 606, a prediction associated with the user device accessing the content may be determined. The prediction may be determined based on the first identification information. The prediction may be determined based on a browsing context associated with the user device. The prediction may comprise a probability that the user device will access the content. The prediction may be based on a determination that a probability that the user device will access the content is above a threshold. As another example, it may be determined whether the second content (e.g., or at least the portion of the second content) is relevant to a browsing context of the user device. For example, it may be determined that the second content is relevant to the browsing context of the user device. It may be determined that the second content is not relevant to a browsing context of the user device. The determination of whether the second content is relevant to the browsing context may be based on the first identification information. The first identification information may indicate a type of the second content, a name of the second content, a use of second content and/or the like. The first identification information may be compared, matched, and/or otherwise analyzed in relation to the browsing context.

The browsing context may comprise a requested resource depth indicating a number of levels of content associations of interest. As an illustration, a resource depth of two levels indicates an interest in links of the first content as well as links of content linked to the first content. The browsing context may comprise device information (e.g., a type of the user device, power information, processor information), browser information (e.g., application, version), historical information (e.g., the last content requested, the content that referenced and/or indicated the presence of the first content, last time the first content was requested), user information, location information (e.g., type of place, coordinates, home, work, travel), a combination thereof and/or the like. The browsing context may be sent to the content device. The browsing context may be sent to the content device in the first request. The second content may be relevant to the browsing context.

At step 608, it can be determined whether the second content is stored in a local storage (e.g., a local cache, an application cache, an application storage, a browser cache) of the user device. For example, it can be determined that the second content is stored in a local storage. It can be determined that the second content is not stored in a local storage. The determination on whether the second content is stored in a local storage of the user device may be based on the first identification information. The first identification information can be compared to identification information of files in the local storage. If the first identification information matches identification information of one of the files in the local storage, then the user device may determine to reject and/or not to request the second content. It can be determined whether a time to live (TTL) value is expired. For example, the file matching the second content may comprise a TTL value indicating an expiration date of the second content. If the TTL value is expired, the user device, may determine to request the second content again. In some implementations, a token may be used to determine whether the second content is expired. The token may be received with the first identification information of the second content. If the token is different than a stored token associated with the stored second content, then it can be determined that the second content is expired.

At step 610, a message requesting or rejecting the second content may be sent (e.g., by the user device). The message may be sent to the content device. The message may be sent based on (e.g., in response to) determining whether the second content is relevant to the browsing context. The message may be sent based on (e.g., in response to) determining whether the second content is located in the local cache. If it is determined that the second content is located in the local cache, the message may reject the second content. If it is determined that the second content is not located in the local cache, the message may request the second content. If it is determined that the content is not relevant to the browsing context, the message may reject the second content. If it is determined that the content is relevant to the browsing context, the message may request the second content.

The message may cause the content device to cancel sending the second content. As an illustration, the message may cause the content device to close a stream (e.g., change a state to a closed state) associated with the second content. The message may comprise data (e.g., a frame) configured to change a status of a logical connection, stream, and/or the like. For example, the message may comprise an RST_STREAM frame of HTTP connection (e.g., HTTP 2 connection). The message may be configured to instruct the content device to release a resource (e.g., a stream, stream reservation, transmission reservation) associated with the second content.

Figure 7:
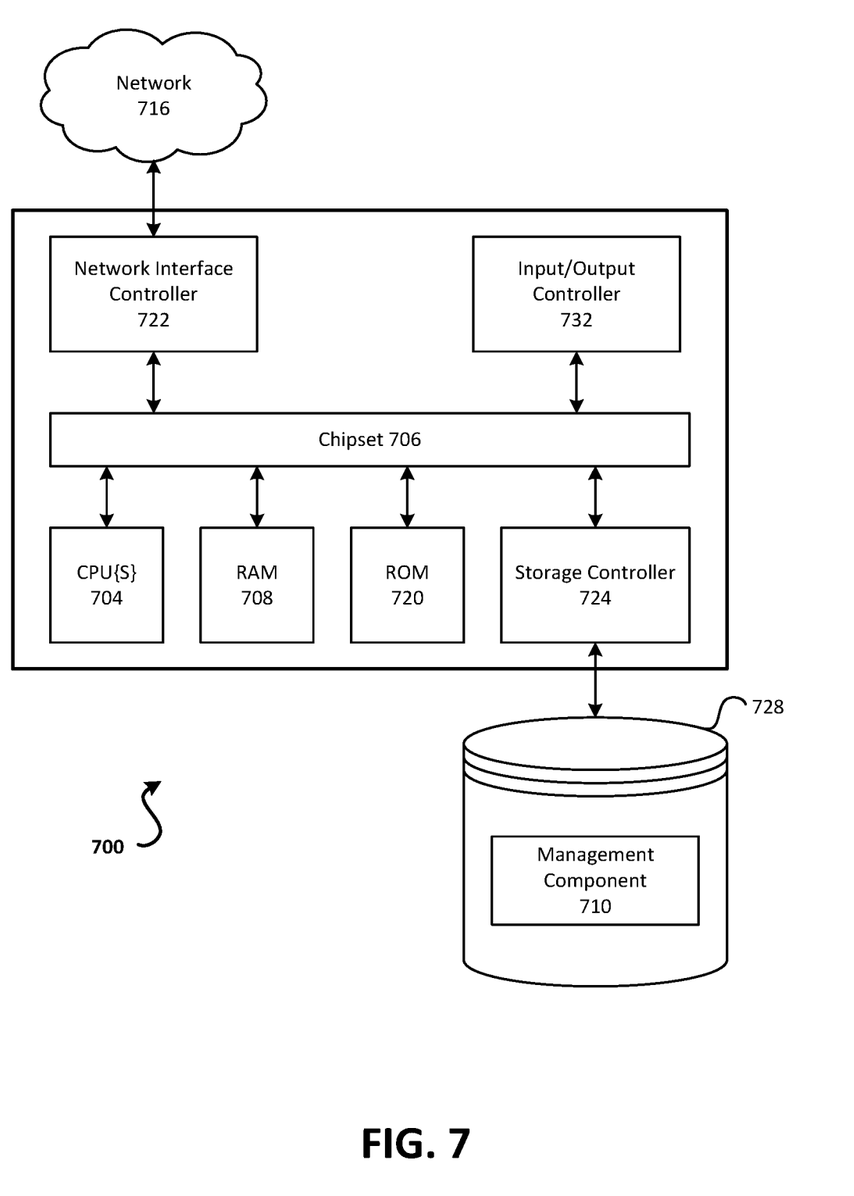
FIG. 7 shows an example computing system.

FIG. 7 shows an example computer architecture for a computing system 700 capable of executing software for performing operations as described above in connection with FIGS. 1-6. It will be appreciated that the described processes may be performed by any suitable system components including, for example, by discrete computing systems that communicate over a communications link. The computer architecture shown in FIG. 7 shows a conventional server computer, workstation, desktop computer, laptop, tablet, network appliance, PDA, e-reader, digital cellular phone, or other computing node, and may be utilized to execute any aspects of the software components presented herein.

The computer 700 may include a baseboard, or "motherboard," which is a printed circuit board to which a multitude of components or devices may be connected by way of a system bus or other electrical communication paths. One or more central processing units (CPUs) 704 may operate in conjunction with a chipset 706. CPUs 704 may be standard programmable processors that perform arithmetic and logical operations necessary for the operation of computer 700.

The CPUs 704 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The chipset 706 may provide an interface between CPUs 704 and the remainder of the components and devices on the baseboard. Chipset 706 may provide an interface to a random access memory (RAM) 708 used as the main memory in computer 700. Chipset 706 may provide an interface to a computer-readable storage medium, such as a read-only memory (ROM) 720 or non-volatile RAM (NVRAM) (not shown), for storing basic routines that may help to start up computer 700 and to transfer information between the various components and devices. ROM 720 or NVRAM may also store other software components necessary for the operation of computer 700 in accordance with the embodiments described herein.

The computer 700 may operate in a networked environment using logical connections to remote computing nodes and computer systems through LAN 716. Chipset 706 may include functionality for providing network connectivity through a network interface controller (NIC) 722, such as a gigabit Ethernet adapter. NIC 722 may be capable of connecting the computer 700 to other computing nodes over LAN 716. It should be appreciated that multiple NICs 722 may be present in computer 700, connecting the computer to other types of networks and remote computer systems.

The computer 700 may be connected to a mass storage device 728 that provides non-volatile storage for the computer. The mass storage device 728 may store system programs, application programs, other program modules, and data, which have been described in greater detail herein. The mass storage device 728 may be connected to computer 700 through a storage controller 724 connected to chipset 706. The mass storage device 728 may comprise of one or more physical storage units. The storage controller 724 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computer 700 may store data on the mass storage device 728 by transforming the physical state of the physical storage units to reflect the information being stored. The specific transformation of a physical state may depend on various factors and on different implementations of this description. Examples of such factors may include, but are not limited to, the technology used to implement the physical storage units and whether mass storage device 728 is characterized as primary or secondary storage and the like.

For example, computer 700 may store information to the mass storage device 728 by issuing instructions through the storage controller 724 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 may further read information from the mass storage device 728 by detecting the physical states or characteristics of one or more particular locations within the physical storage units.

The computer 700 may have access to other computer-readable storage media to store and retrieve information, such as program modules, data structures, or other data. It should be appreciated by those skilled in the art that computer-readable storage media can be any available media that provides for the storage of non-transitory data and that may be accessed by the computer 700.

By way of example and not limitation, computer-readable storage media may include volatile and non-volatile, transitory computer-readable storage media and non-transitory computer-readable storage media, removable and non-removable media implemented in any method or technology. Computer-readable storage media includes, but is not limited to, RAM, ROM, erasable programmable ROM (EPROM), electrically erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage, other magnetic storage devices, or any other medium that can be used to store the desired information in a non-transitory fashion.

The mass storage device 728 may store an operating system utilized to control the operation of the computer 700. According to one embodiment, the operating system comprises a version of the LINUX operating system. According to another embodiment, the operating system comprises a version of the WINDOWS SERVER operating system from the MICROSOFT Corporation. According to further embodiments, the operating system may comprise a version of the UNIX operating system. It should be appreciated that other operating systems may also be utilized. The mass storage device 728 may store other system or application programs and data utilized by the computer 700, such as the management component 710 and/or the other software components described above. The management component may be configured to implement the methods and systems described herein.

The mass storage device 728 or other computer-readable storage media may also be encoded with computer-executable instructions, which, when loaded into the computer 700, transforms the computer from a general-purpose computing system into a special-purpose computer capable of implementing the embodiments described herein. These computer-executable instructions transform the computer 700 by specifying how CPUs 704 transition between states, as described above. The computer 700 may have access to computer-readable storage media storing computer-executable instructions, which, when executed by the computer 700, may perform operating procedures described above in connection with FIGS. 2-6.

The computer 700 may also include an input/output controller 732 for receiving and processing input from a number of input devices, such as a keyboard, a mouse, a touchpad, a touch screen, an electronic stylus, or other type of input device. Similarly, the input/output controller 732 may provide output to a display, such as a computer monitor, a flat-panel display, a digital projector, a printer, a plotter, or other type of output device. It will be appreciated that the computer 700 may not include all of the components shown in FIG. 7, may include other components that are not explicitly shown in FIG. 7, or may utilize an architecture completely different than that shown in FIG. 7.

It should be appreciated that the subject matter presented herein may be implemented as a computer process, a computer-controlled apparatus, or a computing system or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

It will be appreciated that while illustrative embodiments have been disclosed, the scope of potential embodiments is not limited to those explicitly described. For example, while the concepts are described with reference to requests received to perform particular types of functions or commands, the envisioned embodiments extend to processing involving any and all types of functions and commands. Similarly, while the concepts are described with reference to particular protocols and formats, the envisioned embodiments extend to processing involving any and all types of protocols and formats.

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are shown as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the computing systems via inter-computer communication. In some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules, and data structures may also be sent as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal or as multiple discrete digital packets or frames). Such computer program products may also take other forms in other embodiments. Accordingly, the features described herein may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module, or block is necessary or indispensable. Indeed, the disclosure described herein may be embodied in a variety of other forms; furthermore, various omissions, substitutions, and changes in the form of the disclosure described herein may be made without departing from the spirit of the inventions disclosed herein. The accompanying claims and their equivalents are intended to cover such forms or modifications as would fall within the scope and spirit of certain of the inventions disclosed herein.

What is claimed:

1. A method comprising:
    sending, by a user device and to a content device, a first request for first content, wherein the first content comprises an indication of one or more content items;
    receiving, from the content device, a first response to the first request, wherein the first response comprises the first content;
    receiving, from the content device, a second response to the first request comprising a portion of second content, wherein the second content comprises additional information associated with at least a portion of the one or more content items;
    determining, by the user device and based on context information associated with the user device, an access likelihood associated with the user device accessing the second content; and
    sending, to the content device and based on the access likelihood, a message causing the content device to not send the second content.

2. The method of claim 1, wherein the sending the first request for the first content comprises sending a hypertext transfer protocol request via a content browser.

3. The method of claim 1, wherein the content device is configured to generate content comprising a link to access additional content associated with the generated content.

4. The method of claim 1, wherein receiving the first response and receiving the second response comprises receiving the first response and the second response multiplexed via a hypertext protocol connection.

5. The method of claim 1, wherein sending the first request comprises sending, to the content device and in the first request, the context information, and wherein second content is associated with the context information.

6. The method of claim 1, wherein the content device comprises a hypermedia application program interface, and wherein the first content comprises one or more of a field comprising identification information for the second content, a link to the second content, or a list of data resources associated with the first content.

7. A method comprising:
    sending, by a user device to a content device, a first request for first content, wherein the first content comprises an indication of one or more content items;
    receiving, from the content device, a first response to the first request, wherein the first response comprises the first content;
    receiving, from the content device, a second response to the first request comprising a portion of second content, wherein the second content comprises additional information associated with at least a portion of the one or more content items;
    determining, by the user device and based on context information associated with the user device, an access likelihood associated with the user device accessing the second content; and
    based on the access likelihood and the second content not being stored at the user device, sending, to the content device, a message requesting the second content.

8. The method of claim 7, wherein the sending the first request for the first content comprises sending a hypertext transfer protocol request via a content browser.

9. The method of claim 7, and wherein the content device comprises a hypermedia application program interface configured to generate content comprising one or more identifiers for accessing additional content associated with the generated content, and wherein the first content comprises one or more of a field comprising an identifier for accessing the second content, a link to the second content, or a list of data resources associated with the first content.

10. The method of claim 7, wherein receiving the first response and receiving the second response comprises receiving the first response and the second response via multiplexing on a single hypertext transfer protocol connection.

11. The method of claim 7, wherein the context information is sent, to the content device, in the first request, and wherein second content is relevant to the context information.

12. A method comprising:
    receiving, from a user device, a first request for first content, wherein the first content comprises an indication of one or more content items;
    determining, based on the first request, context information associated with the user device;
    determining, based on the context information, second content associated with the first content, wherein the second content comprises additional information associated with at least a portion of the one or more content items;
    sending, to the user device, a first response to the first request comprising the first content; and
    sending, to the user device and based on an access likelihood associated with accessing the second content, a second response to the first request comprising at least a portion of the second content.

13. The method of claim 12, further comprising receiving, from the user device and based on an access likelihood determined by the user device and associated with the user device accessing the second content, a request for a remaining portion of the second content.

14. The method of claim 12, further comprising:
receiving a message indicating that the second content is stored in the user device; and
causing, based on the message, a remaining portion of the second content to not be sent to the user device.

15. The method of claim 12, wherein the receiving the first request for the first content comprises receiving, via a hypermedia application programming interface and from a content browser, a hypertext transfer protocol request.

16. The method of claim 12, wherein receiving the first request for the first content comprises receiving, via an application program interface, the first request for the first content, and wherein the application programming interface is configured to generate content comprising a link to access additional content associated with the generated content.

17. The method of claim 12, wherein the first content references the second content based on one or more of a field comprising an identifier for accessing the second content, a link to the second content, or a list of data resources associated with the first content.

18. The method of claim 12, wherein receiving the first request for the first content comprises receiving, from the user device, the context information with the first request.

19. The method of claim 12, wherein the first content comprises a list of content resources and the second content comprises data fields defining a content resource of the list of content resources.

20. The method of claim 12, wherein the first content comprises a content item on a content page and the second content comprises a content resource supplying additional information associated with the content item for the content page.

21. The method of claim 12, wherein the second content comprises one or more of an image representing the first content or metadata describing the first content.

22. The method of claim 12, wherein the first content and the second content are resources of a content page and have a predefined relationship associated with representing media content via the content page.

23. The method of claim 12, wherein the context information comprises one or more of a device context, a network context, a user context, request context, a content context, or a user interface context.

* * * * *